(12) United States Patent
Brittin et al.

(10) Patent No.: US 7,213,737 B2
(45) Date of Patent: May 8, 2007

(54) GRAPHITE BRAZE BAR INSERTS

(75) Inventors: Kent Earl Brittin, Lockport, NY (US); Elwood B Hausler, Grand Island, NY (US)

(73) Assignee: Delphi Technologies, Inc., Troy, MI (US)

( * ) Notice: Subject to any disclaimer, the term of this patent is extended or adjusted under 35 U.S.C. 154(b) by 248 days.

(21) Appl. No.: 11/005,778

(22) Filed: Dec. 7, 2004

(65) Prior Publication Data

US 2006/0118599 A1 Jun. 8, 2006

(51) Int. Cl.
*B23K 37/00* (2006.01)

(52) U.S. Cl. .................................... 228/44.3

(58) Field of Classification Search ............... None
See application file for complete search history.

(56) References Cited

U.S. PATENT DOCUMENTS

| | | | | |
|---|---|---|---|---|
| 3,093,104 A | * | 6/1963 | Bukata | 228/44.3 |
| 4,720,034 A | | 1/1988 | Lee | 228/37 |
| 5,098,006 A | * | 3/1992 | McManus | 228/42 |
| 5,205,462 A | | 4/1993 | Crosier et al. | 228/44.3 |
| 5,247,739 A | * | 9/1993 | Pardi | 29/890.052 |
| 5,549,238 A | | 8/1996 | Hindle | 228/183 |
| 6,199,742 B1 | * | 3/2001 | Good et al. | 228/106 |
| 2003/0134540 A1 | | 7/2003 | Tran | 439/637 |

FOREIGN PATENT DOCUMENTS

| | | | |
|---|---|---|---|
| GB | 1350154 A | | 4/1974 |
| JP | 02251366 A | | 10/1990 |
| JP | 2001354482 A | * | 12/2001 |

OTHER PUBLICATIONS

EP 05077727 European Search Report Dated Mar. 16, 2006.

* cited by examiner

*Primary Examiner*—Lynne R. Edmondson
(74) *Attorney, Agent, or Firm*—Patrick M. Griffin

(57) ABSTRACT

Disclosed is a braze bar carrier system for utilization in holding and maintaining the alignment of a plurality of components in an apparatus during a brazing process. The braze bar carrier system includes a graphite insert that prevents the brazing flux from wetting the braze bar carrier system thereby preventing brazing filler material from adhering to the carrier system. The graphite insert is readily removable and replaceable. Use of the graphite insert dramatically reduces the number of scrap and damaged assemblies in a brazing operation.

12 Claims, 3 Drawing Sheets

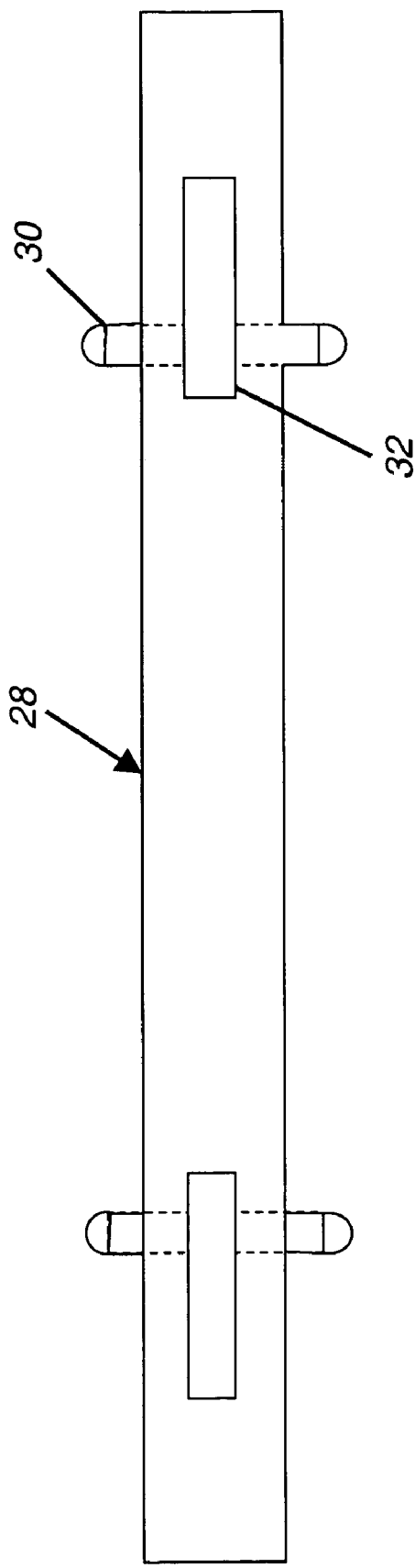
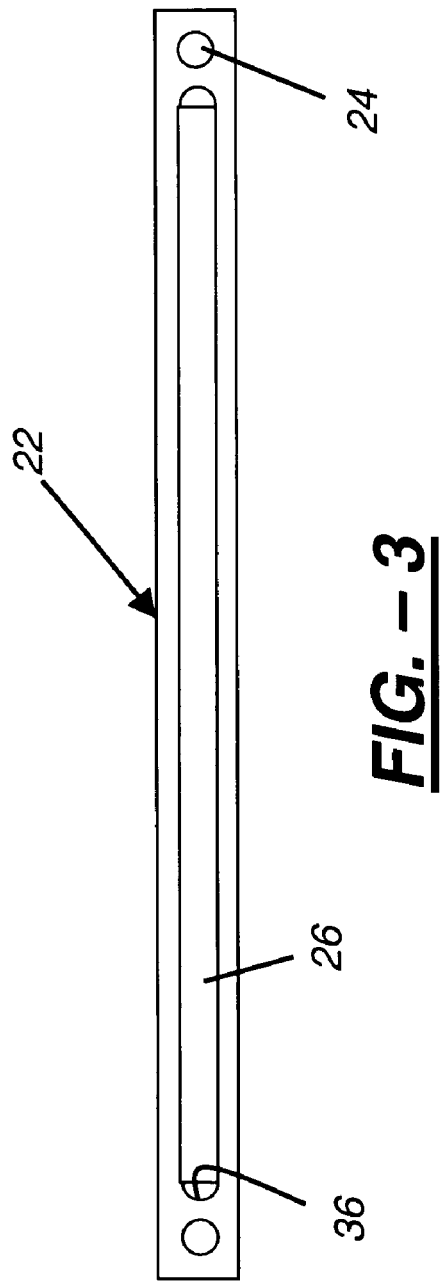
FIG.-2
FIG.-3

GRAPHITE BRAZE BAR INSERTS

FIELD OF THE INVENTION

The present invention relates to carrier systems for holding a structure before, during, and after a brazing operation, and, more particularly to a braze bar carrier system that incorporates a graphite insert.

BACKGROUND OF THE INVENTION

Heat exchangers such as condensers, radiators, evaporators, heater cores, and coolers made of aluminum or aluminum alloy or other metals are widely used today. These heat exchangers generally include perforated fins brazed to the external surface of tubes and plates that form the structure of the heat exchanger. The tubes are usually extruded, welded, or folded and the fins are usually made from coils of sheet stock.

Brazing is a process that involves the joining of components into an apparatus using a brazing filler material whose melting point is lower than that of the components. The brazing process is typically used to join components that are either metals or alloys. Typically the brazing filler material is placed adjacent to or in between the components to be joined or it is clad to one of the components, the components are assembled into the apparatus, and the assembled apparatus is then heated to a temperature where the brazing filler material melts but not the components. Upon cooling, the brazing filler material forms a metallurgical bond between the surfaces of the components.

Prior to assembly into heat exchangers the tubes and plates are typically coated or plated with a corrosion protector using known techniques such as twin-wire arc thermal spraying. Zinc or zinc-aluminum alloys are generally used as a corrosion protector, but any known corrosion inhibitor may be used. The tubes are typically prepared prior to assembly to carry the brazing filler or cladding material that fills the joints between the tube and fins during brazing. The brazing filler is typically applied to thin sheet stock as a cladding layer in the form of an overlayed sheet that is rolled and bonded to the aluminum tube stock. The cladding comprises a material or materials known in the art to be capable of melting at a temperature lower than the heat exchanger components such as an aluminum-silicon alloy so that, during brazing, the cladding will form brazed joints. The use of such clad brazing sheets is well known. Other methods of applying the cladding material include spraying it on or dipping one of the components into a cladding solution.

Prior to brazing of aluminum heat exchangers, tube cladding and plate surfaces must be cleaned and de-oxidized. Removal of the oxidation layer is necessary to form strong joints. This is generally accomplished using a material commonly known as flux that chemically cleans and de-oxidizes the surfaces and protects the aluminum from further oxidation. Typical brazing fluxes contain chlorides and/or fluorides and the flux material typically melts at a lower temperature than that of the brazing filler material. Once molten, the brazing flux material works to dissolve the hard shell of metal oxides on the two surfaces, which enhances the wetting and flow of the molten brazing filler material, thereby allowing it to be drawn freely by capillary force between the joints of the components to be brazed. The composition of the brazing filler material is determined by the composition of the surfaces to be joined as is known by ordinary skill in the art. Likewise, there are numerous brazing flux materials that are available and the particular one utilized depends on the identity of the components to be brazed.

In current manufacturing processes, typically the brazing filler material is applied to one of the surfaces to be joined and the components are pre-assembled into the apparatus. A braze bar carrier system is typically used to hold the components together and in alignment during application of the flux material and during passage through the brazing furnace. After pre-assembly the entire apparatus and carrier system is often dipped in a water-flux slurry or such a water-flux slurry is sprayed onto the entire assembly. Alternatively, the flux material is applied to the entire apparatus via a static dry powder process. As discussed above, the flux is actually only required at the localized areas where the two surfaces are being joined. The entire fluxed apparatus and carrier system are then passed into a brazing furnace where the brazing flux material and filler become liquid and flow between the parts. Once cooled the cladding fuses the parts of the apparatus together.

Prior art carrier systems often comprise brazing trays, frames or bars. Typically these components are formed from stainless steel tubing, turned on edge. The brazing carrier systems are often coated with various paints or other coatings like boron-nitride or green stop off. These coatings are designed to serve as a barrier between the stainless steel surface and the brazing flux material. As these coating materials wear off flux that lands on the stainless steel surface starts to wet the surface thereby allowing the brazing cladding material to braze the trays, frames, and bars to the components being joined. When this occurs this can cause holes and damage to the apparatus when the carrier system parts are removed from the apparatus. This results in quality and scrap problems. In addition, with frequent use these coating materials must typically be reapplied to the carrier system parts on a monthly basis. Thus, it would be advantageous to develop a carrier system that avoided or eliminated the problem of brazing of the carrier system onto the apparatus being carried.

One prior art solution is disclosed in U.S. Pat. No. 6,199,742. In this patent a special tooling base is made of graphite to provide for a controlled co-efficient of thermal expansion between the tooling base and the part being brazed. The disclosed tooling utilizes a series of slip sheets having lubricants such as stop-off compounds and others to prevent sticking of the component being brazed to the tooling. The part to be assembled is received on the slip sheet which is placed on the graphite tooling base. Additional slip sheets are placed on top of the apparatus to be brazed each of the slip sheets including lubricants such as stop-off. Finally pressure is applied to the parts to be brazed in the form of a pan filled with heavy metal pellets. While this disclosure provides some protection of the tooling by utilization of the slip sheets it still requires additional components that need to be replaced and can be subject to wear leading to scrap parts prior to their replacement. In addition, the complicated arrangements of slip sheets can make assembly of the unit difficult. An earlier solution to the problem of adherence of the fixtures to the components being brazed is disclosed in U.S. Pat. No. 5,549,238. In this patent the brazing tray surface in contact with the parts to be brazed comprises a layer of ceramic material. The ceramic material provides a non-stick surface for preventing flux from adhering to the brazing tray. The difficulty with this solution is it can be hard to coat various materials uniformly with a ceramic coating and such coating is fragile and subject to wear. In addition, the non-stick coating cannot be easily replaced and in fact the entire tray must be scraped once the coating has become worn.

Thus there exists a need to provide a brazing fixture having a non-stick surface that is easily replaced and subject to less wear than those found in the prior art.

SUMMARY OF THE INVENTION AND ADVANTAGES

In one embodiment, the present invention is a braze bar carrier system comprising: a braze bar having a pair of braze bar pins and a braze bar insert, the insert comprising a dense graphite material; a first and a second support bar, each of the support bars having a standoff pin; and each of the brazed bar pins contacting one of the standoff pins once said brazed bar carrier system is assembled.

In another embodiment, the present invention is a braze bar comprising a pair of braze bar pins and a braze bar insert formed from a dense graphite material.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is a side view of a support bar designed in accordance with the present invention;

FIG. 3 is a top view of a braze bar designed in accordance with the present invention.

DETAILED DESCRIPTION OF THE PREFERRED EMBODIMENT

Figure 1:
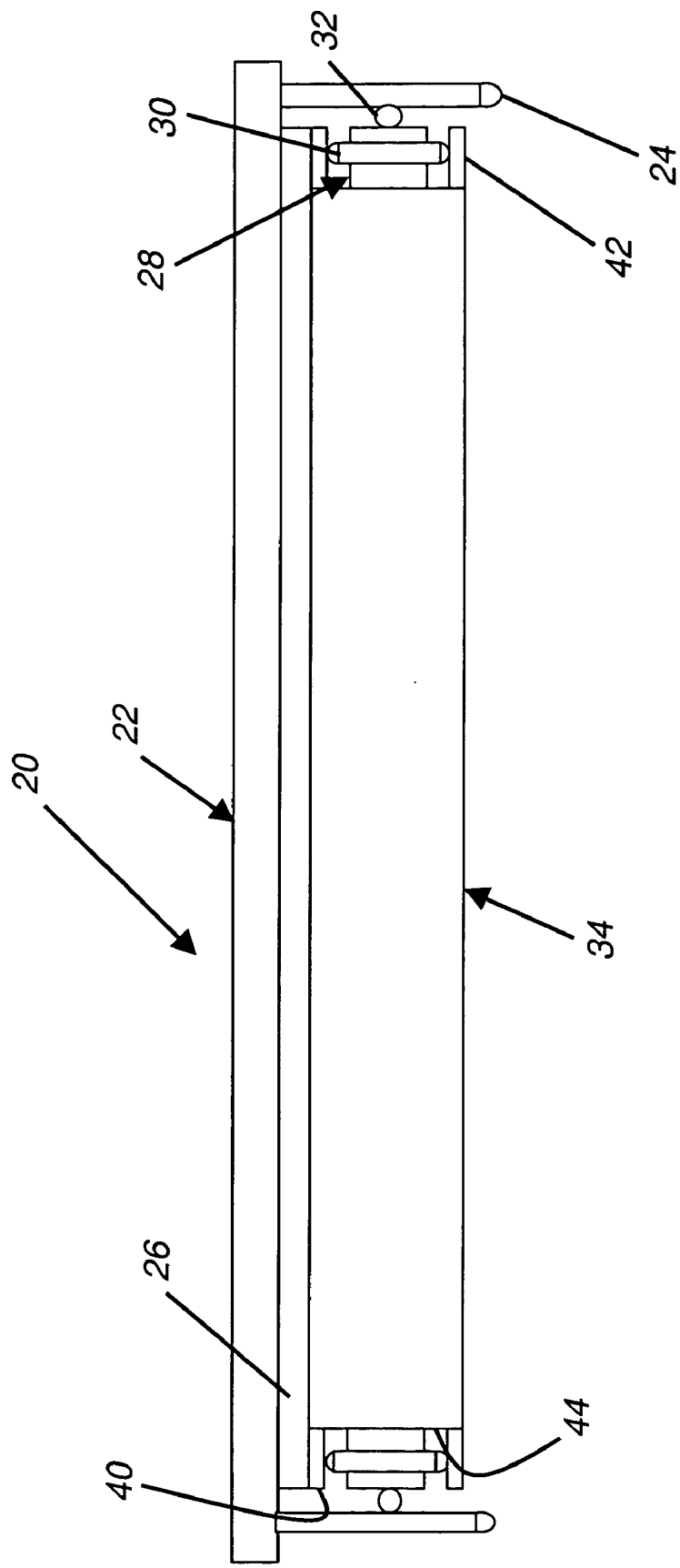
FIG. 1 is an end view of a braze bar carrier system designed according to the present invention assembled onto a radiator core with a header removed for clarity.

In FIG. 1 a braze bar carrier system designed in accordance with the present invention is shown generally at 20 assembled onto a radiator core 34. The carrier system 20 includes at least one braze bar 22 and more preferably two or more braze bars 22. The carrier system 20 further includes a pair of support bars 28. Braze bar 22 includes a pair of braze bar pins 24 and a braze bar insert 26. Braze bar pins 24 are oriented perpendicularly to braze bar 22. The braze bar insert 26 extends below the braze bar 22 and is positioned between the braze bar pins 24. The insert 26 is preferably formed from a very dense graphite material. The graphite material will not allow the flux to adhere to it, thus the braze bar 22 does not stick to the apparatus being brazed. Each support bar 28 includes a support bar stand off pin 32 and preferably a plurality of support bar stand off pins 32. When used to hold a radiator core 34 support bars 28 also preferably include at least one and more preferably a plurality of support bar pins 30. Support bar pins 30 are received in aligned through holes in support bar 28 and extend beyond opposite surfaces of the support bar 28. Preferably, support bar pins 30 and support bar stand off pins 32 are secured to the support bar 28 by welds.

Typically, the radiator core 34 includes a pair of headers 38 and a pair of side plates 44. Radiator core 34 further includes a pair of upper flanges 40 and a pair of lower flanges 42. The side plate 44, upper flange 40 and lower flange 42 are typically a unity piece called a side reinforcement. In assembling the apparatus the support bars 28 are placed between the upper flange 40 and the lower flange 42 and against the side plate 44. The length of the support bar pins 30 is selected to fit between and contact the upper flange 40 and the lower flange 42.

FIG. 2 is a side view of the support bar 28. In this Figure the support bar 28 is shown to include a pair of support bar pins 30 and a pair of support bar standoff pins 32. Those would be understood by one of ordinary skill in the art, depending on the size of the apparatus to be secured in the braze bar carrier system 20 the number of support bar pins 30 and support bar stand off pins 32 can be increased or decreased from those shown. Preferably, the support bar stand off pins 32 are oriented in a direction parallel to the length of the support bar 28. The material used to form the support bar 28, support bar pins 30, and support bar stand off pins preferably is a metal, an example of a preferable metal is stainless steel.

FIG. 3 is a top view of the braze bar 22. The braze bar 22 includes a braze bar slot 36 that receives the braze bar insert 26. The braze bar insert 26 is removable from the braze bar slot 36, preferably with simple hand tools. The braze bar insert 26 can be secured removably in the slot 36 by choosing the dimensions of the slot 36 such that the insert 26 is press fitted into the slot 36. Alternatively, the insert 26 can be secured in the slot 36 using a fastener that is removable. Examples of such fasteners include pins, cotter pins, bolts, screws, and other fasteners known in the art. One advantage of the present invention is that if the insert 26 becomes worn it can be easily removed and replaced with a new insert 26 or alternatively, the insert 26 can be rotated and a non-worn edge of the insert 26 can be exchanged for the worn edge. The braze bar 22 and the braze bar pins 24 preferably are a metal, a preferable example is stainless steel.

Figure 4:
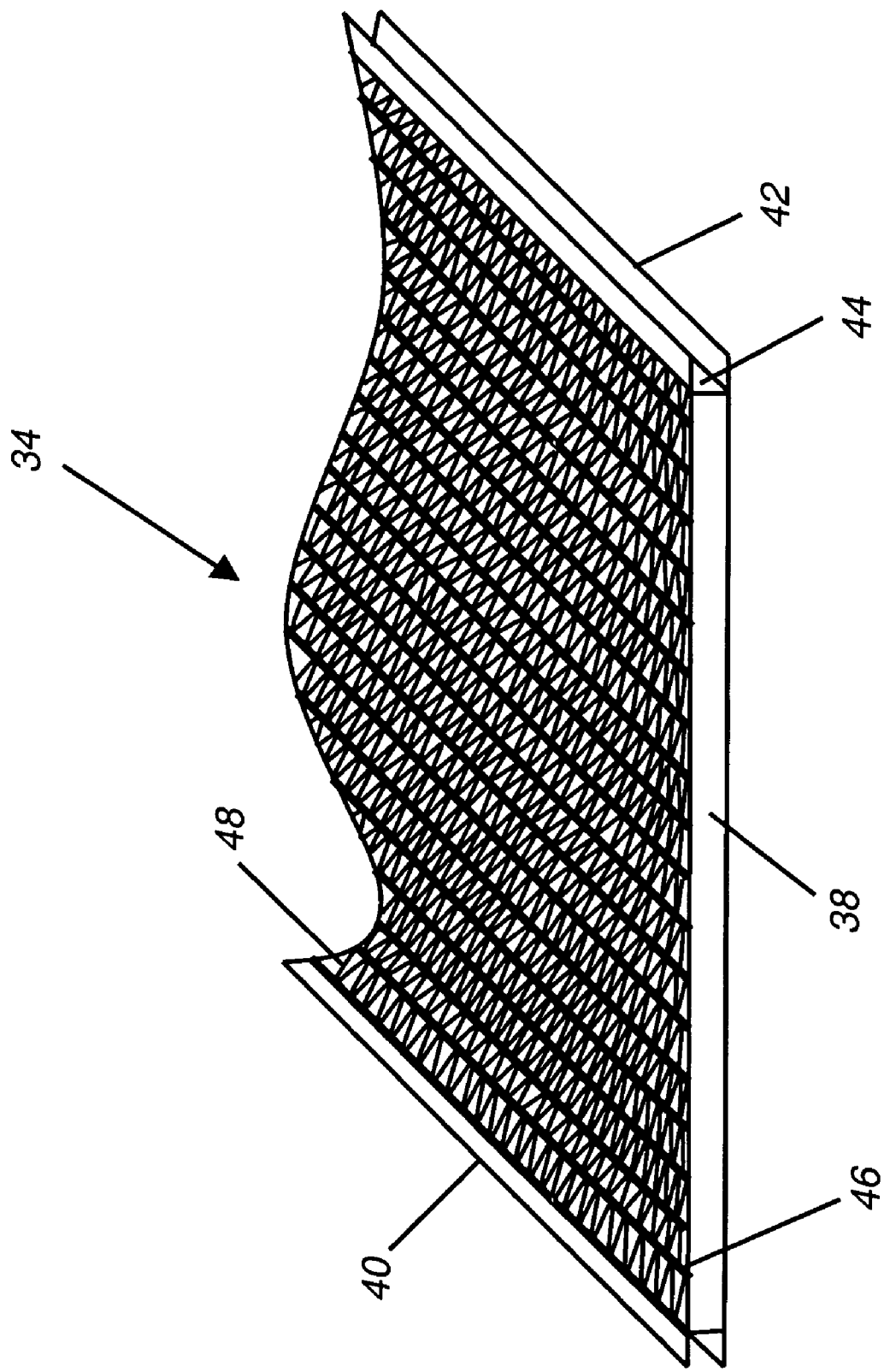
FIG. 4 is a partial perspective view of a radiator core.

FIG. 4 is a partial perspective view of the assembled radiator core 34. In assembling the radiator core 34 a plurality of tubes 46 are assembled between the headers 38 and the side plates 44 and a series of fins 48 are positioned between each tube 46. As discussed above, the tubes 46 can be coated with a corrosion protection material and the fin stock 48 coated with the brazing flux material prior to assembly. Alternatively, the brazing flux can be applied after assembly of the radiator core 34.

In use of the braze bar carrier system 20 the radiator core 34 is assembled as shown in FIG. 4 and then the support bars 28 are placed between the upper flange 40 and the lower flange 42 against the side plate 44. Then the required number of braze bars 22 are placed in a transverse direction across the radiator core 34 to secure the support bars 28 against the radiator core 34 and hold the entire assembly together. Only the insert 26 contacts the radiator core 34, thus preventing the flux from wetting a surface that could braze to the core 34. In addition, the points of contact between the braze bar 22 and the support bar 28 are through pins, ie. a minimal surface contact and neither has any cladding material on it so they do not stick to each other. This also reduces the possibility of the braze bar carrier system being brazed to the apparatus. The assembly comprising the braze bar carrier system 20 and the assembled radiator core 34 are then placed into a brazing furnace at the required temperature and for the required period of time to allow the brazing filler material to flow between the tubes 46 and the fins 48. The entire assembly is then removed from the brazing furnace and allowed to cool whereupon the brazing filler material secures the fins 48 to the tubes 46.

As discussed above the brazed bar insert 26 preferably is a very dense graphite material. More preferably, the insert 26 is formed of a graphite material having a density of 97.5% or greater. Higher density graphite materials can be especially important when the brazing flux material has a high water content. The high density of the graphite insert 26 prevents the flux material from infiltrating into the insert 26.

The foregoing invention has been described in accordance with the relevant legal standards, thus the description is exemplary rather than limiting in nature. Variations and modifications to the disclosed embodiments may become apparent to those skilled in the art and do come within the scope of the invention. Accordingly, the scope of legal protection afforded this invention can only be determined by studying the following claims.

What is claimed is:

1. A braze bar carrier system comprising:
   a braze bar having a pair of braze bar pins and a braze bar insert, said insert comprising a dense graphite material;
   a first and a second support bar, each of said support bars having a stand off pin; and
   each of said braze bar pins contacting one of said stand off pins when said braze bar carrier system is assembled;
   wherein said insert is removable from said braze bar;
   wherein said braze bar further includes a slot and said insert is received in said slot; and
   wherein said insert is removably secured in said slot by at least one fastener.

2. The braze bar carrier system as recited in claim, 1 wherein said fastener is at least one pin, a cotter pin, a bolt, or a screw.

3. The braze bar carrier system as recited in claim 1, wherein said braze bar and said braze bar pins are each formed from a stainless steel material.

4. The braze bar carrier system as recited in claim 1, wherein in said braze bar pins are oriented perpendicularly to said braze bar.

5. The braze bar carrier system as recited in claim 1, wherein said support bars and said stand off pins are formed from a stainless steel material.

6. The braze bar carrier system as recited in claim 1, wherein said support bar and said stand off pin are oriented parallel to each other.

7. The braze bar carrier system as recited in claim 1, wherein each of said first and second support bars include a support bar pin, said support bar pin oriented perpendicular to said support bar.

8. A braze bar carrier system comprising:
   a braze bar having a pair of braze bar pins and a braze bar insert, said insert comprising a dense graphite material;
   a first and a second support bar, each of said support bars having a stand off pin; and
   each of said braze bar pins contacting one of said stand off pins when said braze bar carrier system is assembled;
   wherein each of said first and second support bars include a support bar pin, said support bar pin oriented perpendicular to said support bar; and
   wherein said support bar pin is received in a pair of aligned through holes in said support bar and extends beyond two sides of said support bar.

9. The braze bar carrier system as recited in claim 8, wherein said support bar pin is oriented perpendicular to and closely adjacent to said stand off pin.

10. A braze bar comprising:
    a braze bar having a pair of braze bar pins and a braze bar insert formed from a dense graphite material;
    wherein said insert is removable from said braze bar;
    wherein said braze bar further includes a slot and said insert is received in said slot; and
    wherein said insert is removably secured in said slot by at least one fastener.

11. The braze bar as recited in claim 10, wherein said braze bar and said braze bar pins are each formed from a stainless steel material.

12. The braze bar as recited in claim 10, wherein in said braze bar pins are oriented perpendicularly to said braze bar.

* * * * *